(12) United States Patent
Theis et al.

(10) Patent No.: US 7,308,920 B1
(45) Date of Patent: Dec. 18, 2007

(54) TREE WATERING FUNNEL

(76) Inventors: Thomas R. Theis, 9744 Clippinger Rd., Evansville, IN (US) 47725; Jane Theis, 9744 Clippinger Rd., Evansville, IN (US) 47725

( * ) Notice: Subject to any disclaimer, the term of this patent is extended or adjusted under 35 U.S.C. 154(b) by 0 days.

(21) Appl. No.: 11/545,612

(22) Filed: Oct. 9, 2006

(51) Int. Cl.
*B65B 1/04* (2006.01)

(52) U.S. Cl. ............. 141/331; 141/345; 47/48.5
(58) Field of Classification Search ........ 141/331–345; 47/48.5, 40.5
See application file for complete search history.

(56) References Cited

U.S. PATENT DOCUMENTS

| | | | |
|---|---|---|---|
| 1,233,352 A | * | 7/1917 | Helcher .................. 141/345 |
| 4,130,147 A | * | 12/1978 | Langlie et al. ............. 141/98 |
| D288,520 S | * | 3/1987 | Bozarth .................... D7/398 |
| 5,410,839 A | | 5/1995 | Granger |
| 5,473,838 A | | 12/1995 | Denbigh |
| 5,867,929 A | | 2/1999 | Jung et al. |
| 6,347,479 B1 | * | 2/2002 | Greenberg et al. .......... 47/48.5 |

* cited by examiner

*Primary Examiner*—Steven O. Douglas

(57) ABSTRACT

A funnel has a large water-receiving end to which is fluidically attached a long spout and a handle. The spout extends at an angle with respect to the longitudinal axis of the water-receiving end. The spout has an outlet port that is inserted into soil adjacent to a tree and water poured into the water-receiving end will flow into the soil via the spout.

9 Claims, 1 Drawing Sheet

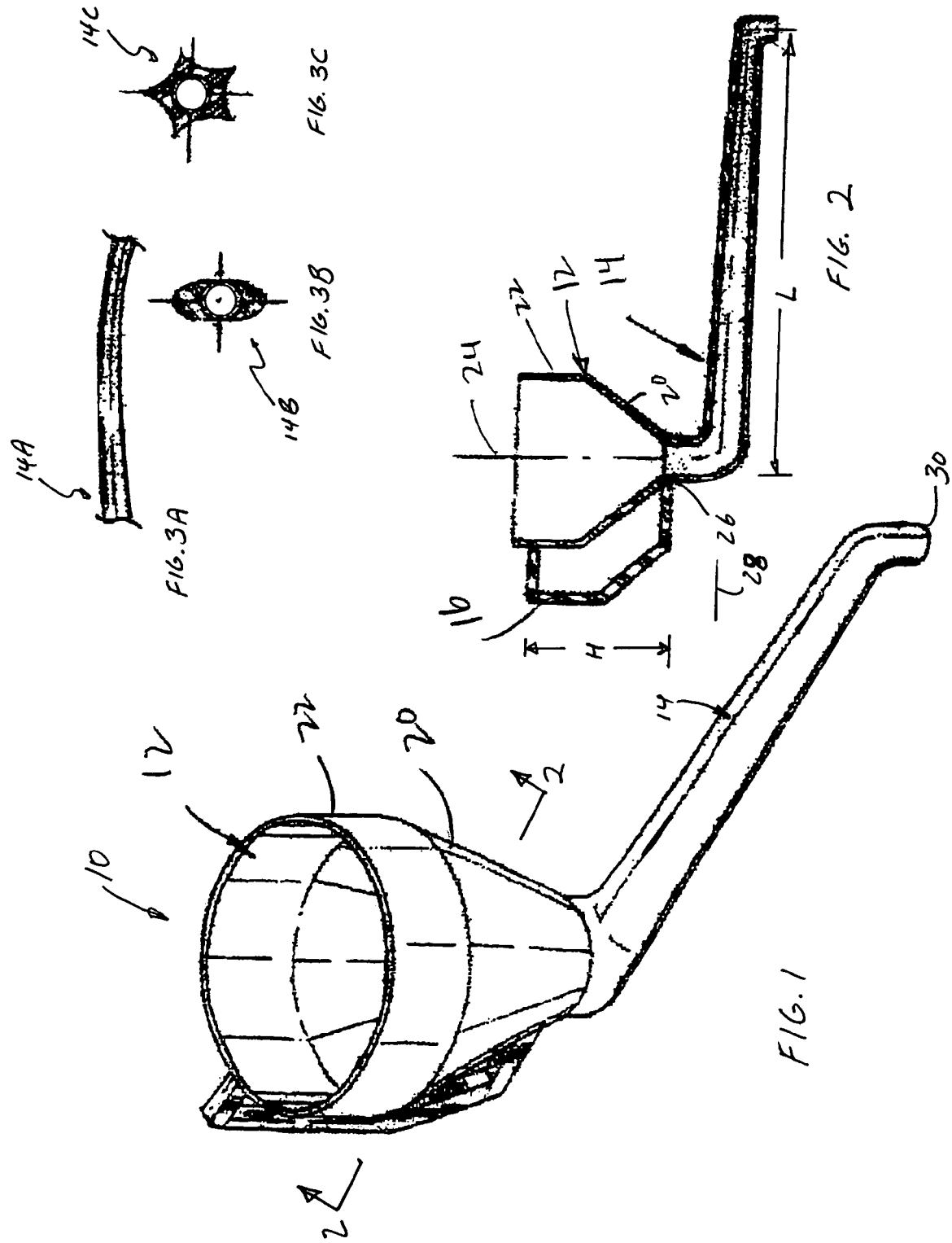

TREE WATERING FUNNEL

TECHNICAL FIELD OF THE INVENTION

The present invention relates to the general art of gardening and agriculture, and to the particular field of watering plants and trees.

BACKGROUND OF THE INVENTION

The inconveniences of watering Christmas trees supported in stands are well known. The breadth of branches surrounding the stand make it somewhat difficult to reach the stand for filling. Further, since the cut trees rapidly absorb water in the stand, the stand must be frequently re-filled. While a number of different prior art devices for watering Christmas trees have attempted to solve these inconveniences, none of the devices known to the inventor are able to efficiently and easily apply water to the soil, especially the soil surrounding a Christmas Tree. Therefore, such a device is needed. However, it is noted that while the above discussion concerns a Christmas Tree, the problem is common to many household plants, and this disclosure is therefore not limited to Christmas Trees alone.

SUMMARY OF THE INVENTION

These, and other, objects are achieved by a funnel that has a large water-receiving end to which is fluidically attached a long spout and a handle. The spout extends at an angle with respect to the longitudinal axis of the water-receiving end. The spout has an outlet port that is inserted into soil adjacent to a tree and water poured into the water-receiving end will flow into the soil via the spout.

BRIEF DESCRIPTION OF THE DRAWING FIGURES

FIG. 1 is a perspective view of a tree watering funnel embodying the present invention.
FIG. 2 is a view taken along line 2-2 of FIG. 1.
FIG. 3A is an arc style spout.
FIG. 3B is an oval style spout.
FIG. 3C is a splined style spout.

DETAILED DESCRIPTION OF THE PREFERRED EMBODIMENT OF THE INVENTION

Other objects, features and advantages of the invention will become apparent from a consideration of the following detailed description and the accompanying drawings.

Referring to the figures, it can be understood that the present invention is embodied in a tree watering funnel 10 which has a main body 12 to which is attached a long spout 14 and a handle 16. The body has a conical portion 20 and a cylindrical portion 22 and has a longitudinal axis 24 that extends between the apex 26 of the conical portion through the cylindrical portion in a direction that is perpendicular to a base plane 28 of the cylindrical portion. The main body has a height dimension H measured along the longitudinal axis from the base plane to the apex.

The spout extends from the apex 26 of the conical portion at a right angle to the longitudinal axis 24 and has an outlet end 30 thereon. The spout has a length dimension L measured between the apex of the conical portion and the outlet end, with the length dimension of the spout being greater than the height dimension of the main body whereby the reach of the spout is increased so difficult to reach areas can be watered. Outlet end 30 is angled to be 95° with respect to length dimension L. With some large christmas trees having a base radius of 30 inches or more, the length dimension L may be at least 30 inches. For instance, the length dimension L may be about 36 inches. Water poured into main body 12 will flow out of outlet end 30.

Use of funnel 10 can be understood from the teaching of the foregoing disclosure, and includes placing the outlet end into the soil, such as soil surrounding a Christmas Tree, and pouring water into the main body 12. The length of the spout will make it easy to reach the soil. Various shapes of the spout can be used, such as shown in FIGS. 3A-3C for arc shaped spout 14A, oval shaped spout 14B and star shaped spout 14C respectively.

It is understood that while certain forms of the present invention have been illustrated and described herein, it is not to be limited to the specific forms or arrangements of parts described and shown.

What is claimed is:
1. A tree watering funnel consisting of:
   A) a main body having
      (1) a conical portion, having an apex and a base plane,
      (2) a cylindrical portion,
      (3) a longitudinal axis which extends between the apex of the conical portion and through the cylindrical portion in a direction that is perpendicular to a base plane of the cylindrical portion;
   B) a spout fluidically attached to the main body, the spout extending from the apex of the conical portion at a right angle to the longitudinal axis and having an outlet end thereon;
   C) a handle attached to the main body at the apex of the conical portion and at the cylindrical portion;
   D) the main body having a height dimension measured along the longitudinal axis from the base plane to the apex;
   E) the spout having a length dimension measured between the apex of the conical portion and the outlet end, the length dimension of the spout being greater than the height dimension of the main body; and
   F) the outlet end of the spout being angled to be 95° with respect to the length dimension of the spout.

2. The tree watering funnel defined in claim 1 wherein the spout is arcuate in shape.

3. The tree watering funnel defined in claim 1 wherein the spout is oval shaped.

4. The tree watering funnel defined in claim 1 wherein the spout is star shaped.

5. A tree watering funnel consisting of:
   A) a main body having
      (1) a conical portion, having an apex and a base plane,
      (2) a cylindrical portion,
      (3) a longitudinal axis which extends between the apex of the conical portion and through the cylindrical portion in a direction that is perpendicular to a base plane of the cylindrical portion;
   B) a spout fluidically attached to the main body, the spout extending from the apex of the conical portion at a right angle to the longitudinal axis and having an outlet end thereon;
   C) a handle attached to the main body at the apex of the conical portion and at the cylindrical portion;
   D) the main body having a height dimension measured along the longitudinal axis from the base plane to the apex; and E) the spout having a length dimension measured between the apex of the conical portion and the outlet end, the length dimension of the spout being at least 30 inches.

6. The tree watering funnel defined in claim 5 wherein the spout is arcuate in shape.

7. The tree watering funnel defined in claim 5 wherein the spout is oval shaped.

8. The tree watering funnel defined in claim 5 wherein the spout is star shaped.

9. The tree watering funnel defined in claim 5 wherein the length dimension of the spout is about 36 inches.

* * * * *